T. Bowers,
Making Wooden Screws.
Nº 57,282. Patented Aug. 21, 1866.
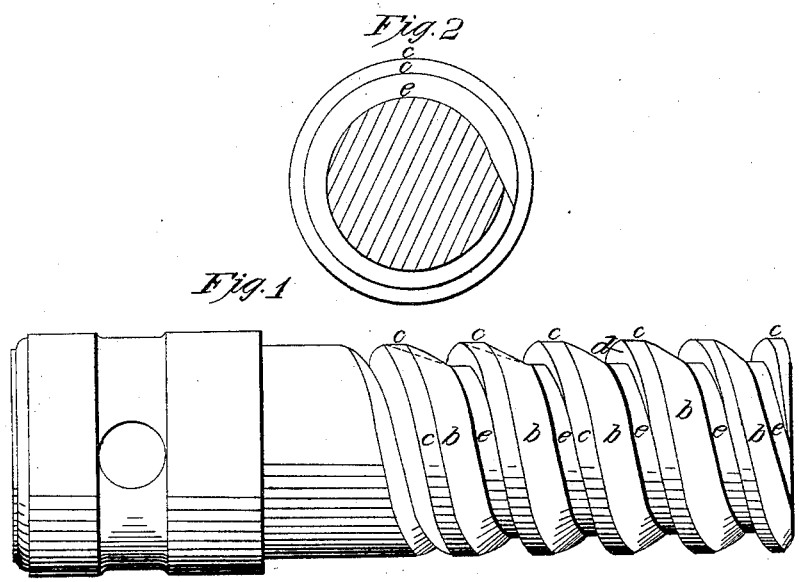
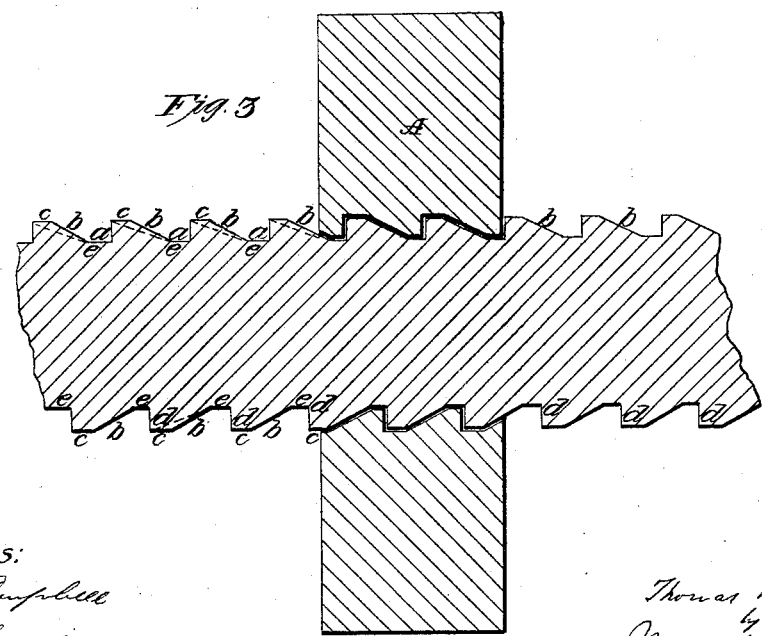
Witnesses:
R. T. Campbell
Edw Schafer
Inventor:
Thomas Bowers
by his Atty's
Mason, Fenwick & Lawrence

UNITED STATES PATENT OFFICE.

THOMAS BOWERS, OF ZANESVILLE, OHIO.

IMPROVEMENT IN WOODEN SCREWS.

Specification forming part of Letters Patent No. 57,282, dated August 21, 1866.

*To all whom it may concern:*

Be it known that I, THOMAS BOWERS, of Zanesville, in the county of Muskingum and State of Ohio, have invented a new and Improved Wooden Bench-Screw; and I do hereby declare that the following is a full, clear, and exact description thereof, reference being had to the accompanying drawings, making a part of this specification, in which—

Figure 1 is an external view of my improved wooden screw. Fig. 2 is a cross-section, showing the end of the screw. Fig. 3 is a diametrical section through the screw and its nut.

Similar letters of reference indicate corresponding parts in the several figures.

This invention relates to a novel mode of constructing the spiral thread of a wooden bench-screw, so as to obtain greater strength in a given-sized thread than can be obtained by the square or the double or single beveled screw-threads hitherto made.

One great objection to wooden screws having double-beveled or V threads is that the outer edges or acute angles soon break off in the nut and prevent the screws from working smoothly or holding firmly. Another objection to such threads is that they press outward, or at right angles, to the body of the screw while turning it, and occasion considerable friction, not only on account of the large surface presented to the corresponding surface of the nut, but also because of the outward pressure above mentioned.

The square-faced threads obviate these objections to some extent, and are preferable to the V-shaped threads for wooden screws for this reason; but this form is also objectionable for the reason that when the male and female threads are made large enough to be durable the spiral inclination or angle is necessarily so great that the power of the screw is greatly diminished; hence the reason that spiral square-faced threads will not answer for wooden screws where considerable power is required, and that the double or single beveled acute-edge thread is always employed for bench-screws, and wooden screws for other purposes.

To enable others skilled in the art to understand my invention, I will describe its construction and operation.

In the accompanying drawings I have represented my invention applied to a bench-screw, but I do not wish to be understood as confining the invention to screws for this purpose alone.

My improved thread may be formed upon the cylindrical screw-blanks by first forming the well-known square-faced thread, and leaving a narrow space, *a*, between this spiral thread, which space should be equal in width to the width which it is desired to have the outer extremity of the thread when finished. One edge of this square thread is then turned down, so as to leave the beveled surface *b*, and to form a space of sufficient size to admit the thread of the nut A, which is of a corresponding shape to that of the male screw, as shown in Fig. 3.

In beveling the square-faced thread its base is not reduced; but the space between the outer ends of the thread is increased in proportion to the width of the base of the thread on the nut or female screw.

I do not mean to state that my screw-thread is, in practice, made by first forming the square-faced thread, but merely desire to show that the improved thread of a given thickness will occupy less space upon a screw-blank than the square thread of the same thickness of base and strength would occupy; hence a greater number of spiral turns may be made with my thread upon a screw-blank of a given length than can be made by the square thread.

The inclined surface *b* forms an obtuse angle to the surface *c*, which is the circumference of the thread; and this surface, which is parallel to the axis of the screw, forms a right angle with the surface *d*, which latter is perpendicular to the axis of the screw, and also at right angles to the cylindrical surface *e*, as clearly shown in Fig. 3.

It will thus be seen that there is no acute angle left in producing the thread, and that the circumference of the thread is not liable to become broken, as would be the case were the thread to terminate in an acute angle. I therefore combine the compactness of the V-shaped thread with the strength of the square-faced thread, and with a thread which has no acute angle I form a lapping-thread of great strength, the bearing-surfaces *d* of which can be brought very close together.

I am aware that it is not new to construct wood-screws of metal having one side of the thread perpendicular to the axis of the screw, the opposite side of the thread being beveled, so as to leave the outer edge of such thread very acute; but it is obvious that a wooden screw could not be made to work practically in this way.

I do not therefore claim, broadly, a thread having one perpendicular side, as shown in Kendall's metal wood-screw, patented June 14, 1859; nor do I claim metal wood-screws such as are made by the machine patented by Thomas Sloan in 1850; but What I do claim as my invention, and desire to secure by Letters Patent, is—

As an improved new article of manufacture, the wooden screw which works in a nut or matrix constructed with a spiral thread which has a bearing-surface, $d$, perpendicular to the axis of the screw, a cylindrical surface, $c$, which is parallel to said axis, and an inclined surface, $b$, which forms an obtuse angle with the cylindrical surfaces $c$ and $e$, all as described and represented, and for the purpose set forth.

THOMAS BOWERS.

Witnesses:
　JOHN QUIGLEY,
　SAMUEL CHAPMAN.